United States Patent
Fujita et al.

(10) Patent No.: US 8,159,911 B2
(45) Date of Patent: Apr. 17, 2012

(54) RECORDING DEVICE, RECORDING METHOD, DISC MANUFACTURING METHOD AND OPTICAL DISC RECORDING MEDIUM

(75) Inventors: Goro Fujita, Kanagawa (JP); Takeshi Miki, Tokyo (JP); Takashi Shimouma, Kanagawa (JP); Koji Ashizaki, Tokyo (JP); Masato Nakakura, Tokyo (JP)

(73) Assignee: Sony Corporation, Tokyo (JP)

( * ) Notice: Subject to any disclaimer, the term of this patent is extended or adjusted under 35 U.S.C. 154(b) by 807 days.

(21) Appl. No.: 11/915,162

(22) PCT Filed: May 11, 2006

(86) PCT No.: PCT/JP2006/309512
§ 371 (c)(1),
(2), (4) Date: May 29, 2008

(87) PCT Pub. No.: WO2006/126404
PCT Pub. Date: Nov. 30, 2006

(65) Prior Publication Data
US 2009/0028014 A1    Jan. 29, 2009

(30) Foreign Application Priority Data

May 24, 2005  (JP) .................................. 2005-151007

(51) Int. Cl.
*G11B 5/00* (2006.01)
(52) U.S. Cl. ..................................... 369/47.5; 369/275.4
(58) Field of Classification Search .................. 369/47.5, 369/275.4
See application file for complete search history.

(56) References Cited

U.S. PATENT DOCUMENTS

| | | | | |
|---|---|---|---|---|
| 4,896,313 A * | 1/1990 | Hirose et al. | ............... | 369/275.4 |
| 4,896,314 A * | 1/1990 | Skiens et al. | ................... | 369/284 |
| 5,459,712 A * | 10/1995 | Sugaya et al. | ............. | 369/275.4 |
| 5,602,824 A * | 2/1997 | Ooki et al. | ................. | 369/275.4 |
| 5,617,408 A * | 4/1997 | Nishizawa et al. | ......... | 369/275.4 |
| 7,236,439 B2 * | 6/2007 | Usui et al. | .................. | 369/59.25 |

FOREIGN PATENT DOCUMENTS

| | | |
|---|---|---|
| JP | 8-124219 | 5/1996 |
| WO | 2002-101733 | 12/2002 |

* cited by examiner

*Primary Examiner* — Aristotelis Psitos
(74) *Attorney, Agent, or Firm* — Oblon, Spivak, McClelland, Maier & Neustadt, L.L.P.

(57) ABSTRACT

An optical disc recording medium is irradiated with laser light having a predetermined laser power to deform an irradiated portion of a substrate into a protruding portion. Since the substrate is deformed so as to have protruding portions, a reflecting layer arranged on the substrate is also deformed so as to have protruding portions. For a pit, the deformed state of a protruding portion allows to obtain a reproduced signal level equivalent to that in each land. For a land, the deformed state of a protruding portion allows to obtain a reproduced signal level equivalent to that in each pit. Since the deformed state of each protruding portion can be controlled on the basis of the power of the laser light for irradiation, pit-to-land deformation and land-to-pit deformation can be performed by setting the laser power. Thus, recorded data can be rewritten on the optical disc recording medium recorded with the data using a combination of pits and lands formed in the substrate.

9 Claims, 14 Drawing Sheets

FIG. 8
(a) 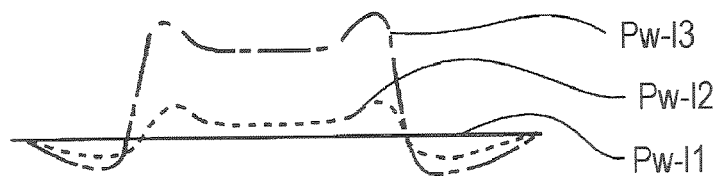
(b) 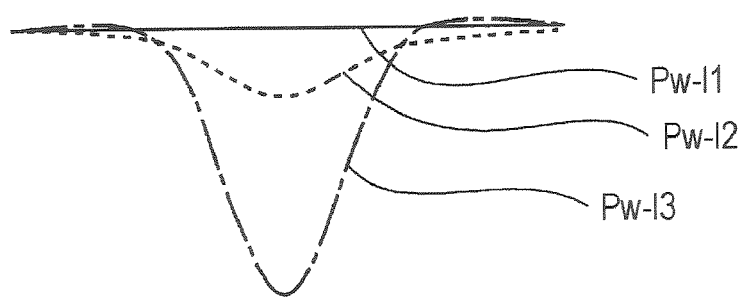
FIG. 9
(a) 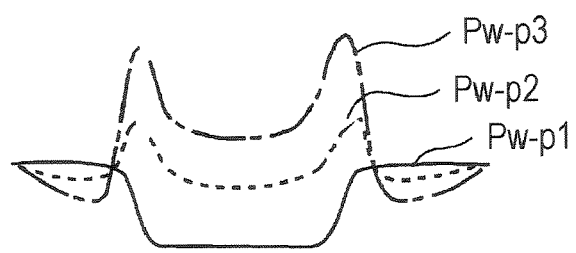
(b) 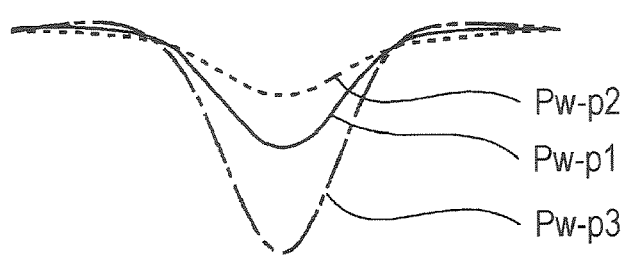

FIG. 13

| ADDRESS | ID BIT | | | POLARITY |
|---|---|---|---|---|
| | BYTE 1 | BYTE 2 | BYTE 3 | |
| 000001 | 0 | 1 | 1 | 1 |
| 000002 | 0 | 1 | 0 | 0 |
| ⋮ | ⋮ | ⋮ | ⋮ | ⋮ |

FIG. 16
(a) 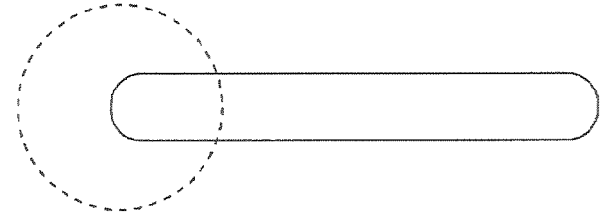
(b) 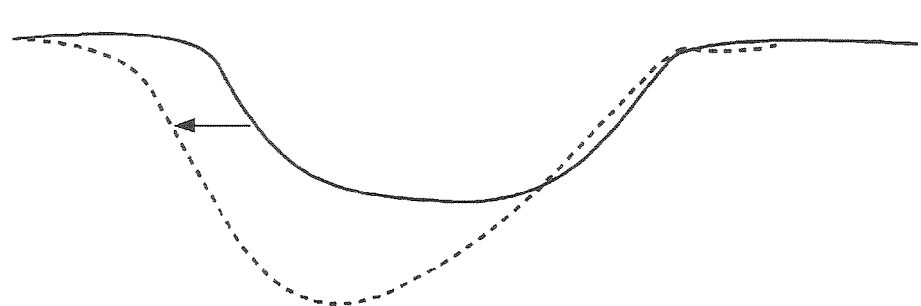

RECORDING DEVICE, RECORDING METHOD, DISC MANUFACTURING METHOD AND OPTICAL DISC RECORDING MEDIUM

TECHNICAL FIELD

The present invention relates to a recording apparatus for recording data onto an optical disc recording medium using a combination of pits and lands and a recording method for the same. The present invention also relates to an optical disc recording medium onto which data is recorded with such a combination of pits and lands and a method of manufacturing the medium.

BACKGROUND ART

Optical discs, particularly, read-only optical discs, such as ROM discs, are used as package media all over the world since replica substrates of each disc can be mass-produced by plastic injection molding using a single stamper at low cost in a short time. For example, CDs (compact discs) and DVDs (digital versatile discs) are widespread as ROM discs on which information, such as a piece of music or video images, is recorded.

Related art is disclosed in Japanese Patent No. 3454410.

DISCLOSURE OF INVENTION

Although replica substrates of each ROM disc can be mass-produced at low cost in a short time as described above, recorded data cannot be rewritten in terms of its signal recording form. If data recorded on a ROM disc can be rewritten, it is possible to provide an optical disc recording medium, such as a writable disc, on which recorded data can be rewritten while the above-described advantages are maintained. It is extremely preferable.

In consideration of the above-described problem, the present invention provides a recording apparatus including the following elements.

In other words, the recording apparatus is for an optical disc recording medium, which includes a substrate overlaid with at least a reflecting layer and a cover layer and is recorded with data using a combination of pits and lands formed in the substrate. The apparatus includes laser irradiation means for irradiating the optical disc recording medium with laser light having a predetermined laser power to deform an irradiated portion of the substrate into a protruding portion.

The apparatus further includes recording control means for controlling the laser irradiation means so that predetermined pits or lands in the optical disc recording medium are irradiated with the laser light having the predetermined laser power.

As described above, the substrate is irradiated with laser light and irradiated portions are deformed into protruding portions, so that a reflecting layer arranged on the substrate is also deformed so as to have protruding portions. For the predetermined pits, the deformed state of each protruding portion of the reflecting layer caused by the above-described deformation of the substrate allows to obtain at least a positive reproduced signal level in each pit. In other words, the deformation allows to obtain a reproduced signal level equivalent to that in each land (hereinafter, this deformation will also be termed "pit-to-land deformation"). As for the predetermined lands, the deformation allows to obtain at least a negative reproduced signal level in each land. In other words, the deformation allows to obtain a reproduced signal level equivalent to that in each pit (hereinafter, this deformation will also be called "land-to-pit deformation").

In this instance, since the deformed state of each protruding portion can be controlled on the basis of the power of laser light for irradiation, the pit-to-land deformation and the land-to-pit deformation can be performed by setting the laser power.

BRIEF DESCRIPTION OF THE DRAWINGS

FIG. 8 includes diagrams schematically showing a change in cross section of the substrate caused by changing laser power when recording is performed in a land and the waveforms of reproduced signals obtained with the change.

FIG. 9 includes diagrams schematically showing a change in cross section of the substrate caused by changing laser power when recording is performed in a pit and the waveforms of reproduced signals obtained with the change.

FIG. 13 is a data structure diagram showing the descriptions of data to be stored in the recording apparatus in the application example of the present embodiment.

FIG. 16 includes diagrams explaining an operation in a case where edge shift is performed by extending a pit.

BEST MODE FOR CARRYING OUT THE INVENTION

Best modes (hereinafter, referred to as "embodiments") for carrying out the invention will be described. The description will be made in the following order:

<1. Optical Disc Recording Medium>;
<2. Recording Apparatus>;
<3. Principle of Recording>; and
<4. Application Example>.

<1. Optical Disc Recording Medium>

Figure 1:
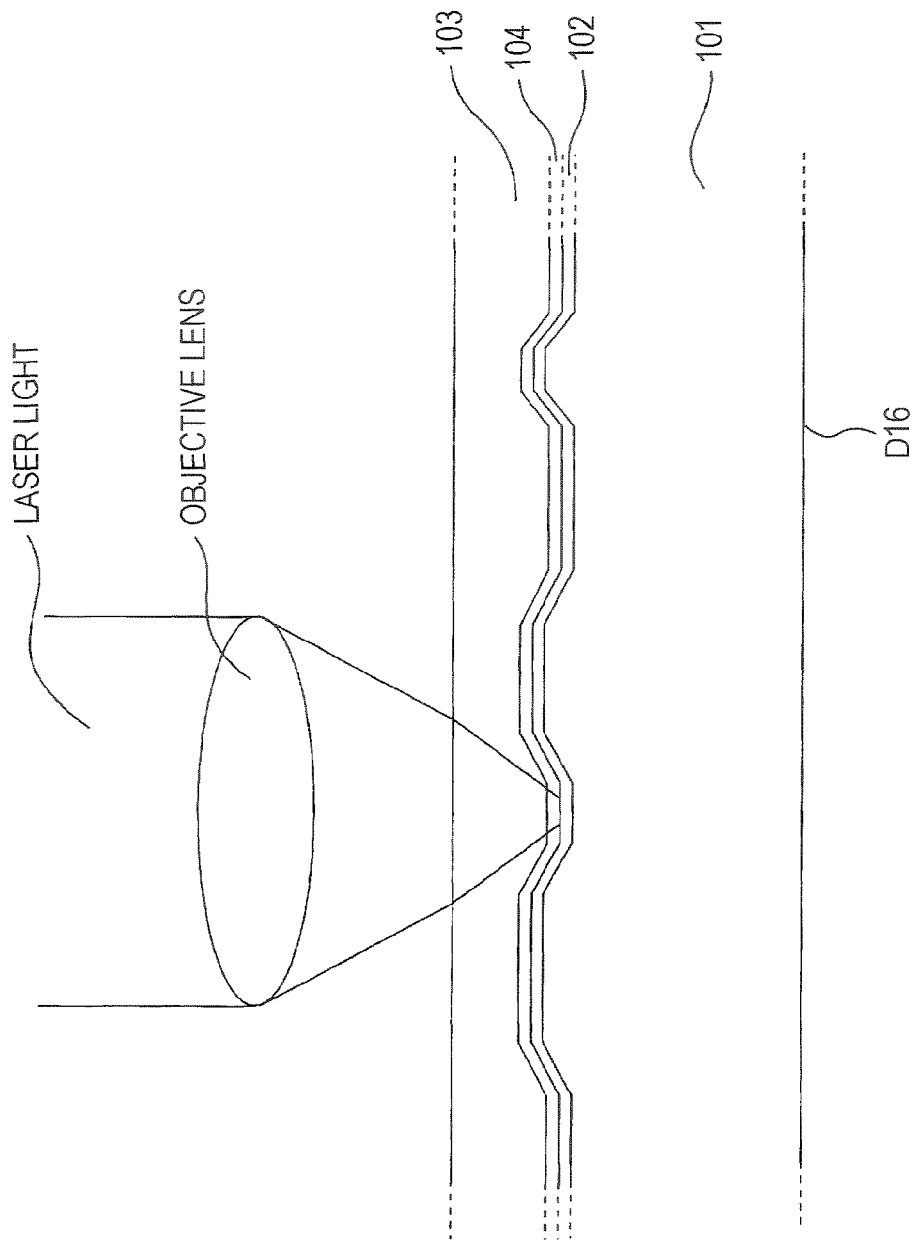
FIG. 1 is a cross-sectional view of an optical disc recording medium (primary-data recording disc) according to an embodiment of the present invention, the medium serving as a recording target of a recording apparatus.

FIG. 1 is a cross-sectional view of an optical disc recording medium (primary-data recording disc D16) according to an embodiment, the medium serving as a recording target of a recording apparatus.

The primary-data recording disc D16 according to the present embodiment is a read-only (ROM) disc. Specifically, the disc has a structure and format based on the standard for discs called Blu-ray discs (registered trademark).

As shown in the diagram, this disc D16 includes a substrate 101, a reflecting layer 102 arranged on the substrate 101, and a cover layer 103 bonded to the reflecting layer 102 with UV curable resin (or infrared curable resin) 104. The surface of the substrate 101 in contact with the reflecting layer 102 has an irregular pattern. Each recessed portion corresponds to a pit and each protruded portion corresponds to a land. In the disc D16, data is recorded using a combination of pits and lands, specifically, the lengths of respective pits and those of respective lands.

Since the reflecting layer 102 is arranged on the substrate 101, the reflecting layer 102 also has an irregular cross-section corresponding to that pattern of the above-described pits and lands. The reflecting layer 102 is, for example, a metal film. When laser light condensed by an objective lens is applied to the reflecting layer 102 through the cover layer 103 and the UV curable resin 104 as shown in the diagram, reflected light according to the irregularity is obtained. A recording apparatus 50, which will be described later, can read data, recorded using the combination of pits and lands, on the basis of light reflected by the reflecting layer 102 irradiated with the laser light.

Figure 2:
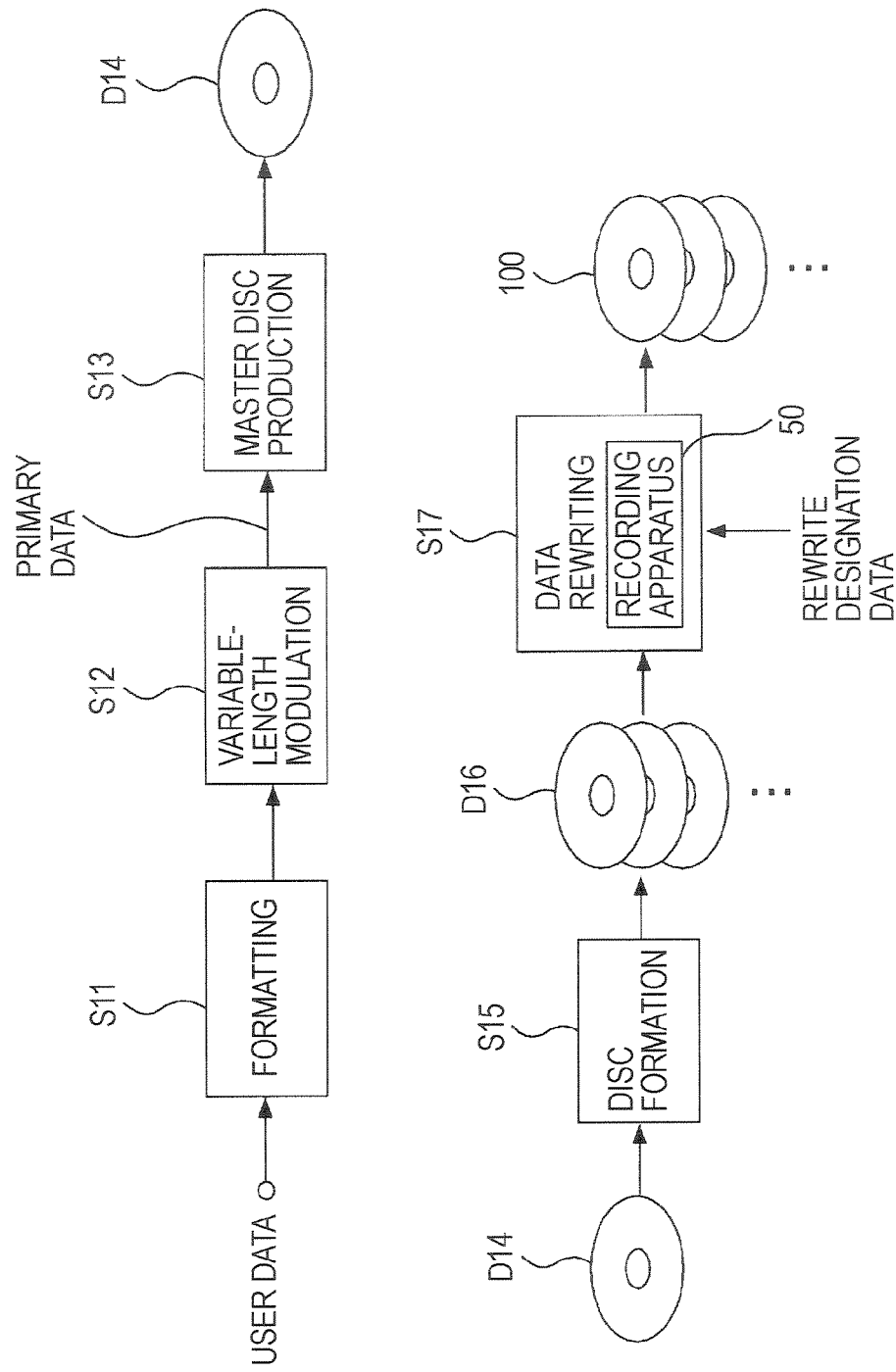
FIG. 2 is a diagram explaining a process of manufacturing optical disc recording media according to the embodiment.

FIG. 2 is a diagram explaining a process of manufacturing the above-described primary-data recording discs D16 and making the optical disc recording media (discs 100) according to the embodiment, each medium being obtained by rewriting data recorded on the disc D16.

To make the disc 100 (primary-data recording disc D16), a formatting step S11 in the diagram is first performed. The formatting step S11 is executed using, e.g., a computer.

Figure 3:
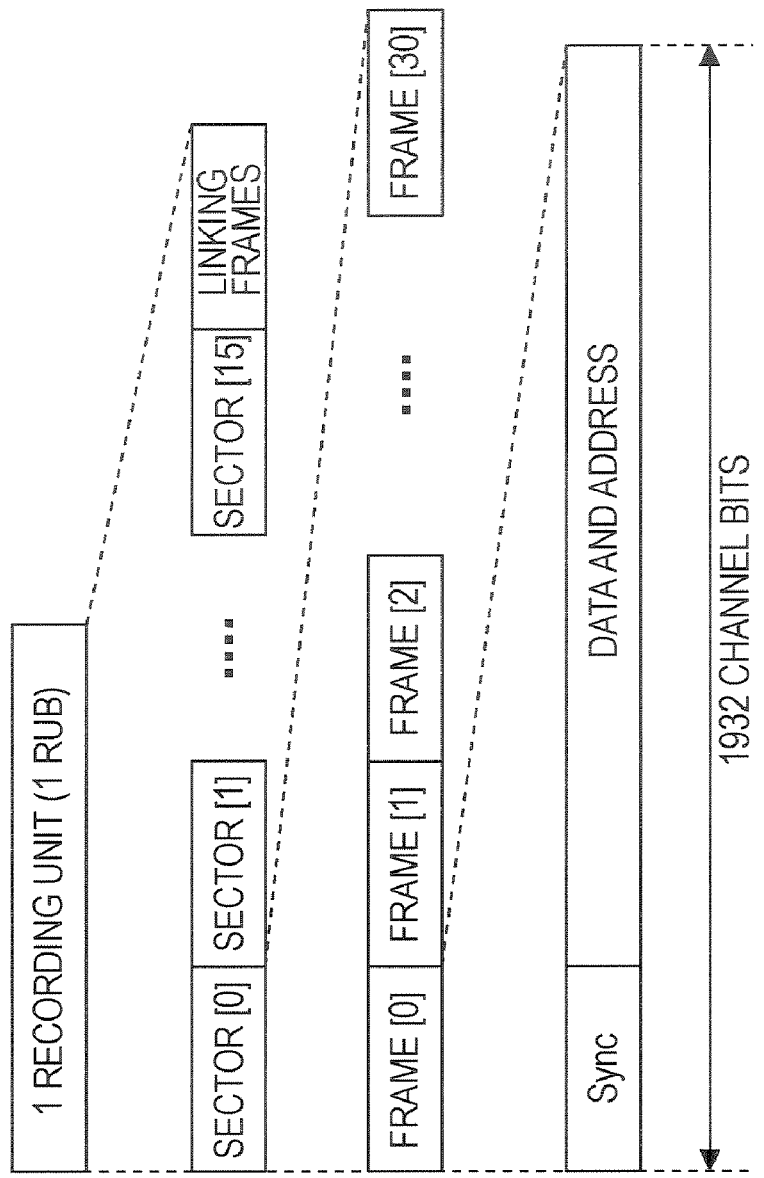
FIG. 3 is a data structure diagram explaining the data structure of data to be recorded onto the optical disc recording medium shown in FIG. 1.

In the formatting step S11, a conversion operation is performed to obtain a data stream, formatted in a predetermined standard, corresponding to content data (user data) to be recorded onto the primary-data recording disc D16 (disc 100). In other words, in the present embodiment, the conversion operation is performed to obtain a data stream according to the Blu-ray Disc standard as shown in FIG. 3 which will be described later. Actually, addition of an error-detecting code and an error-correcting code to the user data and interleaving are also performed.

In a variable-length modulation step S12, variable-length modulation is performed on the data stream generated in the formatting step S11. In the present embodiment, RLL (1, 7) PP (Parity preserve/prohibit, RLL: Run Length Limited) modulation and NRZI (Non Return to Zero Inverse) modulation are performed. A pattern of bits "0" and "1" in the data stream obtained in the variable-length modulation step S12 serves as a pattern of data (also called "primary data") to be actually recorded using a combination of pits and lands onto the primary-data recording disc D16 (disc 100).

Subsequently, a master disc production step S13 is performed. The master disc production step S13 is performed using a mastering apparatus.

In the master disc production step S13, first, a glass master disc is coated with photoresist. Laser light according to the primary data generated in the above-described variable-length modulation step S12 is applied to the glass master disc coated with the photoresist while the master disc is being rotated, thus forming an irregular pattern, i.e., pits and lands along a recording track.

Subsequently, the resist in which the pits and the lands are formed is developed, thus fixing the pattern onto the glass master disc. The surface of the resultant master disc is subjected to electrolytic plating, so that a metal master disc D14 is produced as shown in the diagram.

A disc formation step S15 is performed using the metal master disc D14 produced in that manner.

In the disc formation step S15, a stamper is formed using the above-described metal master disc D14. The stamper is arranged in an injection mold and, after that, the substrates 101 of transparent resin, e.g., polycarbonate or acryl are formed by an injection molding machine. Each substrate 101 has the pattern of pits and lands along a recording track, the pits and lands being based on the primary data generated in the foregoing variable-length modulation step S12.

The substrate 101 is coated with the reflecting layer 102 by evaporation. The cover layer 103 is bonded to the reflecting layer 102 with the UV curable resin 104. Thus, the primary-data recording disc D16 on which only data (primary data) based on the combination of pits and lands is recorded is formed.

Subsequently, a data rewriting step S17 is performed.

In other words, in this step, the recording apparatus 50, which will be described later with reference to FIG. 4, irradiates the above-described formed primary-data recording disc D16 with laser light to rewrite the recorded primary data, thus producing the disc 100 according to the embodiment.

Rewriting recorded data through the recording apparatus 50 according to another embodiment will be described later.

FIG. 3 shows the data structure of an information signal recorded on each disc 100 (primary-data recording disc D16) made by the above-described manufacturing process.

As shown in the diagram, one recording unit called an RUB is defined. A single RUB is composed of 16 sectors and two linking frames. The linking frames are provided as a buffering area between RUBs.

Each sector is composed of 31 frames as shown in the diagram. Each frame includes data of 1932 channel bits. In this case, each frame includes a single address unit.

In a Blu-ray disc exemplified in the embodiment, an information signal recorded on the disc conforms to the RLL (1, 7) PP modulation rule. Accordingly, the number of successive codes "0" and "1" (i.e., the length of each of a pit and a land) is limited to a length ranging from 2 T (channel bits) to 8 T.

For "sync" located at the head of each frame, successive codes of 9 T which do not follow that modulation rule are arranged and are used to detect a frame synchronization signal during reproducing.

<2. Recording Apparatus>

Figure 4:
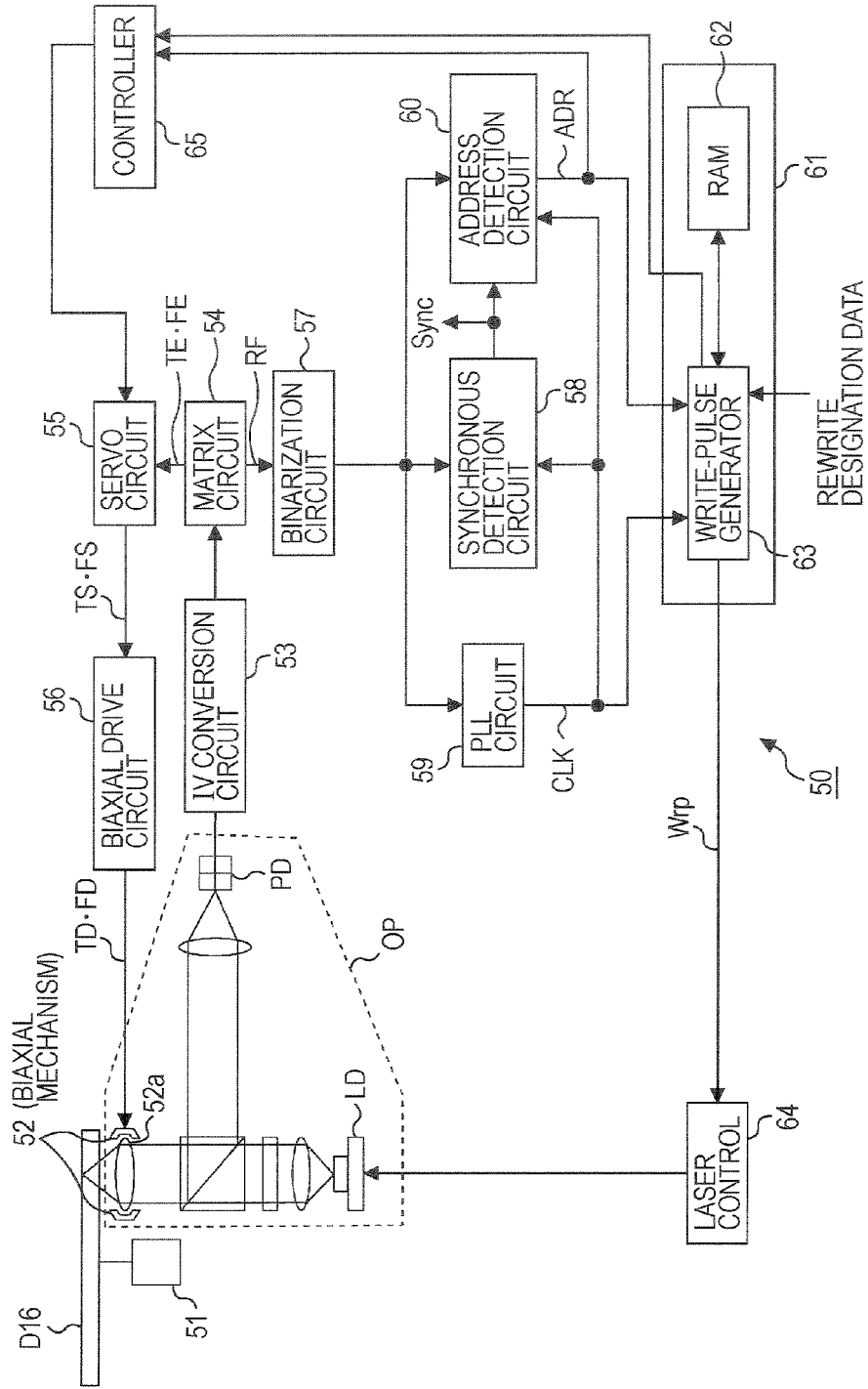
FIG. 4 is a block diagram of the internal structure of the recording apparatus according to an embodiment.

FIG. 4 shows the internal structure of the recording apparatus 50 according to the embodiment, the recording apparatus 50 irradiating the primary-data recording disc D16 with laser light to produce the disc 100 in the data rewriting step S17 shown in FIG. 2.

First, the disc D16 is rotated in accordance with a predetermined rotating method by a spindle motor 51 while being disposed on a turntable (not shown). An optical pickup OP, shown in the diagram, reads a recorded signal (recorded data) from the disc D16 rotated as described above.

The optical pickup OP includes a laser diode LD, serving as a laser source as shown in the diagram, an objective lens 52a for focusing laser light onto the recording surface of the disc D16, and a photodetector PD for detecting light reflected by the disc D16 irradiated with the laser light.

The optical pickup OP further includes a biaxial mechanism 52 holding the objective lens 52a movably in the focusing direction and the tracking direction. The biaxial mechanism 52 moves the objective lens 52a in the above-described focusing and tracking directions on the basis of a focus drive signal FD and a tracking drive signal TD supplied from a biaxial drive circuit 56, which will be described later.

For confirmation, the above-described focusing direction is the direction in which the objective lens 52a is moved closer to or farther away from the disc D16.

Information as the reflected light detected by the photodetector PD in the above-described optical pickup OP is converted into an electrical signal by an IV conversion circuit 53. After that, the electrical signal is supplied to a matrix circuit 54. The matrix circuit 54 generates a reproduced signal RF, a tracking error signal TE, and a focus error signal FE on the basis of the reflected-light information supplied from the IV conversion circuit 53.

A servo circuit 55 performs predetermined operations for phase compensation, e.g., filtering and loop gain processing, on the tracking error signal TE and the focus error signal FE supplied from the matrix circuit 54 to generate a tracking servo signal TS and a focus servo signal FS. The servo circuit 55 supplies the tracking servo signal TS and the focus servo signal FS to the biaxial drive circuit 56.

The biaxial drive circuit 56 generates the tracking drive signal TD and the focus drive signal FD on the basis of the tracking servo signal TS and the focus servo signal FS and supplies the generated signals to a tracking coil and a focusing coil of the biaxial mechanism 52.

The photodetector PD, the IV conversion circuit 53, the matrix circuit 54, the servo circuit 55, the biaxial drive circuit 56, and the biaxial mechanism 52 shown in the diagram constitute a tracking servo loop and a focus servo loop. The arrangement of the tracking servo loop and the focus servo loop allows for control so that the beam spot of laser light applied to the disc D16 traces a sequence of pits (recording track) formed in the disc D16 and the beam spot is held in an appropriate focused state.

The reproduced signal RF generated by the above-described matrix circuit 54 is supplied to a binarization circuit 57, in which PRML (Pertial Response Maximum Likelihood) decoding is performed to obtain binary data "0" or "1". The binary data is supplied to a synchronous detection circuit 58 and a PLL (Phase Locked Loop) circuit 59.

The PLL circuit 59 generates a clock CLK synchronized with the supplied binary data and supplies the clock as an operational clock to necessary components. Particularly, the clock CLK is supplied as an operational clock for each of the above-described binarization circuit 57 and components which will be described below, i.e., the synchronous detection circuit 58, an address detection circuit 60, and a write-pulse generation circuit 61.

The synchronous detection circuit 58 detects a sync pattern, arranged in each frame shown in FIG. 3, from the supplied binary data. Specifically, the synchronous detection circuit 58 detects a segment of 9 T, serving as the sync pattern, to perform frame synchronous detection.

A frame synchronization signal is supplied to the address detection circuit 60 and necessary components.

The address detection circuit 60 detects address information ADR on the basis of the above-described frame synchronization signal and the supplied binary data. The detected address information ADR is supplied to a controller 65. The address information ADR is also supplied to a write-pulse generator 63 in the write-pulse generation circuit 61.

The write-pulse generation circuit 61 includes the write-pulse generator 63 and a RAM (Randam Access Memory) 62 as shown in the diagram.

The write-pulse generation circuit 61 receives rewrite designation data used to designate positions in which the primary data recorded on the disc D16 is to be rewritten. Simultaneously, the address information ADR supplied from the above-described address detection circuit 60 and the clock CLK supplied from the PLL circuit 59 are supplied to the write-pulse generation circuit 61.

For example, for the rewrite designation data, information indicating rewrite positions using data strings, in each of which a data value corresponding to each rewrite position is "1" and other data values are "0", is supplied. The write-pulse generator 63 stores the data strings into the RAM 62. During playback of the disc D16, the write-pulse generator 63 outputs the data strings as write pulse signals Wrp, shown in the diagram, to a laser control unit 64 on the basis of the address information ADR and timing produced by the clocks CLK. For example, the write pulse signals Wrp for rewriting the recorded data in a proper designated position are generated by the above-described operation.

The laser control unit 64 controls the laser power of the laser diode LD in the optical pickup OP on the basis of the write pulse signals Wrp output from the above-described write-pulse generation circuit 61. Specifically, in this case, the laser control unit 64 controls the laser diode LD to output laser light having a reproducing power when the write pulse signal Wrp is at a low (L) level. When the write pulse signal Wrp is at a high (H) level, the laser control unit 64 controls the laser diode LD to output laser light having a recording power.

The controller 65 includes, for example, a microcomputer and controls the whole recording apparatus 50.

For example, the controller 65 gives a target address to the servo circuit 55, thus controlling a seeking operation. In other words, when designating the target address, the controller 65 allows the servo circuit 55 to perform an access operation by the optical pickup OP in the target address.

In addition, when giving a track jump instruction to the servo circuit 55, the controller 65 allows the servo circuit 55 to turn off the tracking servo loop and perform a track jump operation.

<3. Principle Of Recording>

An embodiment relates to rewriting data recorded on the disc D16 through the above-described recording apparatus 50, the data being recorded using the combination of pits and lands. The principle will be described below.

FIGS. 5 to 9 show results of recording by actually irradiating the primary-data recording disc D16 with laser light having a recording power through the recording apparatus 50.

Figure 5:
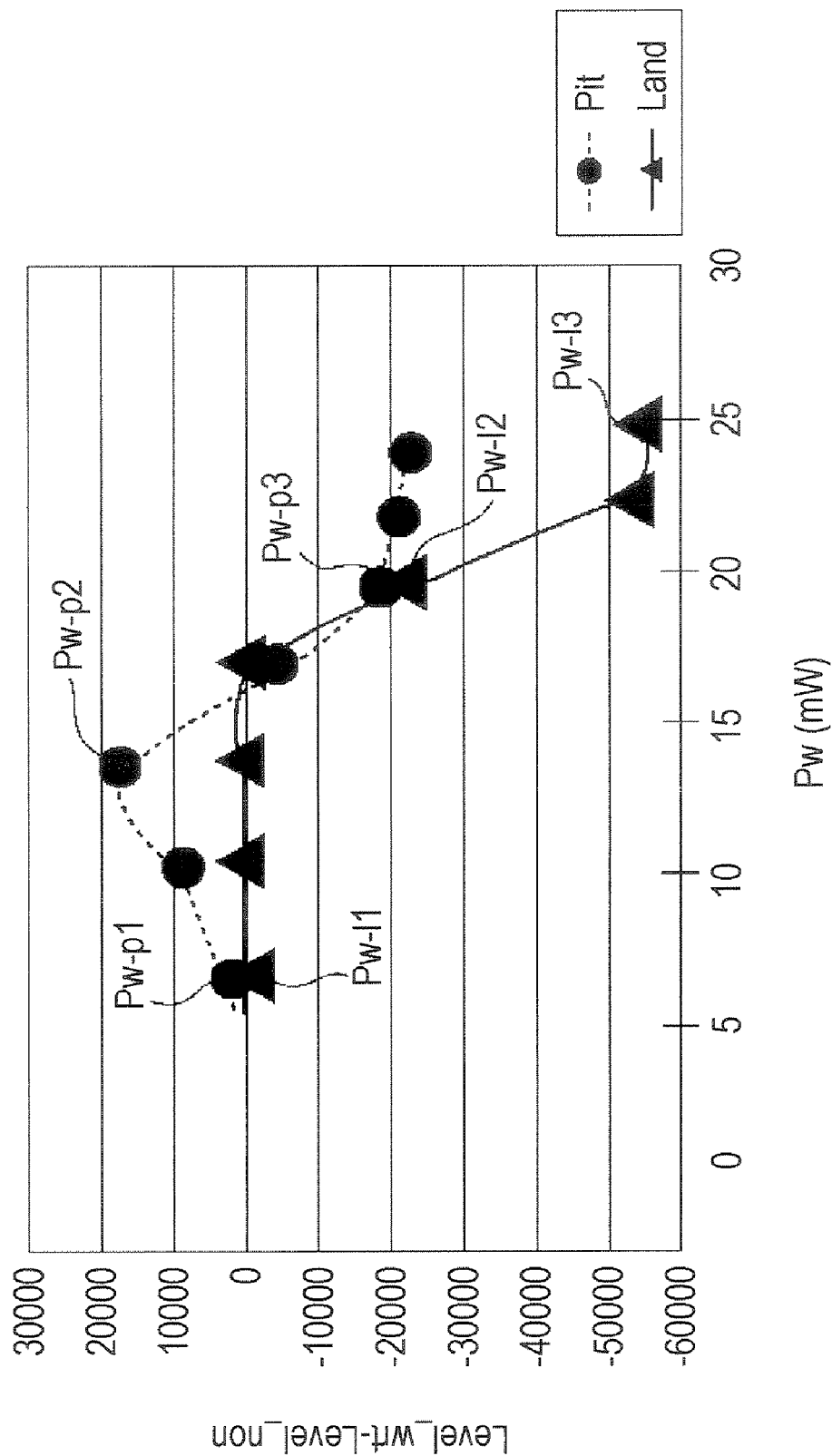
FIG. 5 is a graph showing variation characteristics of reproduced signal levels plotted against laser power Pw in a portion (recorded portion) where recording is performed by laser irradiation.

FIG. 5 shows variation characteristics of reproduced signal levels plotted against laser power Pw (mW) in portions (recorded portions) where recording was performed by laser irradiation.

In this graph, a change in each reproduced signal level in a recorded portion is expressed by the difference between a reproduced signal level (Level_wrt) in a recorded portion and a reproduced signal level (Level_non) in an unrecorded portion. In this graph, the variation characteristic of the reproduced signal level obtained in a case where recording was performed on a pit is expressed by a combination of solid circles and a dashed line. The variation characteristic of the reproduced signal level obtained in a case where recording was performed on a land is expressed by another combination of solid triangles and a solid line.

For reference, conditions set when the results shown in FIG. 5 were obtained will now be described as follows:

Substrate 101 . . . polycarbonate;

Reflecting layer 102 . . . aluminum (Al) 70, iron (Fe) 15, copper (Cu) 15;

Adhesive between the cover layer 103 and the reflecting layer 102 . . . the UV curable resin 104;

Laser irradiation time (write pulse width) 30 ns;

Linear velocity=4.917 m/s;

Laser wavelength $\lambda$=405 nm; and

Numerical aperture NA=0.85.

As for recording in a land (hereinafter, land recording) indicated by the solid line, the laser power Pw is raised from the lowest level Pw-11. There is no difference between the reproduced signal level in a recorded portion and that in an unrecorded portion until the laser power Pw reaches at a certain level (in the graph, Pw is approximately 17 mW). When the laser power Pw is further increased, the difference between the reproduced signal level in the recorded portion and that in the unrecorded portion has a negative value. In other words, in this characteristic, the reproduced signal level in the recorded portion is lowered after the laser power Pw reaches the certain level.

In this instance, when the laser power Pw is approximately a level Pw-12 higher than the level at which the reproduced signal level starts to decrease as described above, the reproduced signal level is lowered to approximately half of a reproduced signal level of a pit (hereinafter, pit level), thus starting recording. In other words, the reproduced signal level has a negative value, thereby realizing land-to-pit deformation.

When the laser power Pw is approximately the level Pw-12, the reproduced signal level is fluctuated depending on a recorded portion, leading to unstable recording (in this case, unstable land-to-pit deformation). For land recording, when the laser power Pw is set to be higher than the above-described level Pw-12, the reproduced signal level can be further reduced. When the laser power Pw is at the level Pw-13 as shown in the graph, the reproduced signal level can be stabilized at a level lower than the pit level. In order to ensure land-to-pit deformation, therefore, the laser power Pw may be set to the level Pw-12 or higher, preferably, approximately the level Pw-13.

On the other hand, for recording in a pit (hereinafter, pit recording), when the laser power Pw is increased from a level Pw-p1, a reproduced signal level is stably increased. The reproduced signal level is raised to about half or more of the mirror level (reproduced signal level of a land) at a laser power level Pw-p2 in the graph. In other words, the reproduced signal level is switched to a positive value, thus realizing pit-to-land deformation.

After the laser power Pw is raised to the level Pw-p2, the reproduced signal level tends to lower. After the laser power Pw is approximately a level Pw-p3 or higher, the reproduced signal level is stabilized to a level lower than the original pit level.

As described above, it is found that, during pit recording, a pit can be stably deformed into a land when the laser power Pw is approximately the level Pw-p2. When the laser power Pw is at or above the level Pw-p3, stable recording can be performed at a reproduced signal level lower than the normal pit level (in an unrecorded portion).

Figure 6:
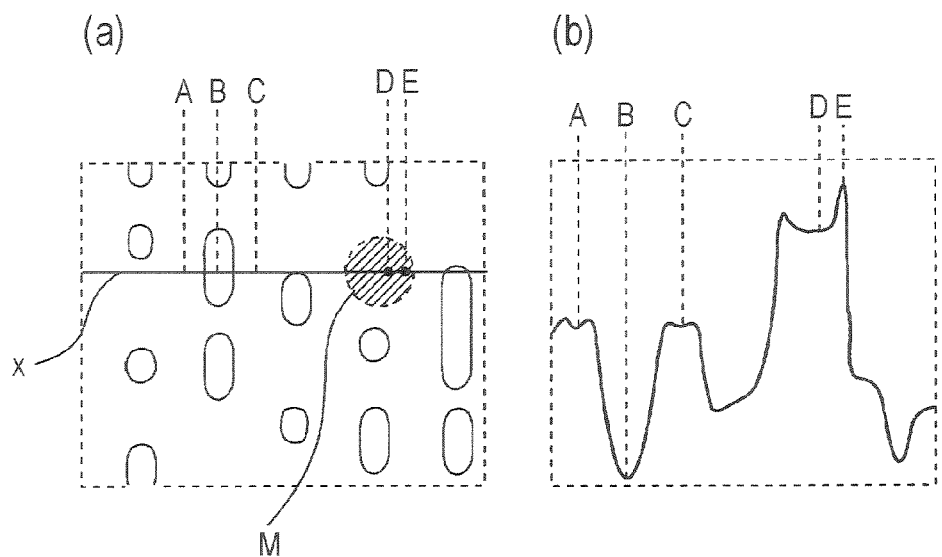
FIG. 6 includes diagrams schematically showing a result of observation on the substrate when recording is performed in a land.
Figure 7:
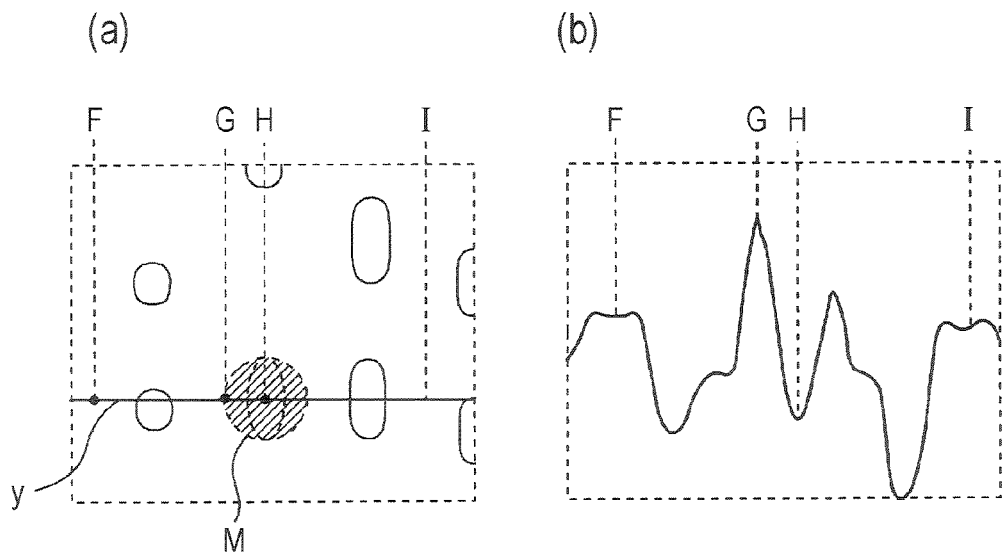
FIG. 7 includes diagrams schematically showing a result of observation on the substrate when recording is performed in a pit.

FIGS. 6 and 7 schematically show states of the substrate 101 of the disc 100 on which recording was performed by the above-described laser irradiation, the cover layer 103 and the reflecting layer 102 being separated from the substrate 101 and the resultant substrate 101 being observed using an atomic force microscope (AFM). In each of FIGS. 6 and 7, (a) is a plan view of the substrate 101 and (b) is a cross-sectional view of the substrate 101 taken along a solid line x or y. In FIGS. 6 and 7, broken lines A to E and those F to I in (b) indicate respective positions of points A to E and those of points F to I in (a).

As the result of observation, it is found that the surface (overlaid with the reflecting layer 102) of the substrate 101 is deformed into a protruding state (portion) in a recorded portion M in each of land recording shown in FIG. 6 and pit recording shown in FIG. 7.

The protruding states are caused by the expansion of resin of the substrate 101 adjacent to the reflecting layer 102 into a sphere since the reflecting layer 102 was heated at a high temperature by laser irradiation with a relatively high laser power.

FIGS. 8 and 9 schematically show deformations of the protruding portions of the substrate 101 according to the change in the laser power Pw shown in FIG. 5 and the waveforms of reproduced signals obtained upon deformation. In each diagram, (a) shows the cross sections of the deformed substrate 101 and (b) shows reproduced signal waveforms.

In the case of land recording shown in FIG. 8, the amount of reflected light tends to decrease in association with an increase in the height of a protruding portion, formed by monotonously raising the substrate 101, in accordance with the increase of the laser power Pw in this order of Pw-11, Pw-12, and Pw-13 shown in FIG. 5. On the basis of the above-described principle, in the case of land recording, the reproduced signal level tends to gradually decrease in accordance with the increase of the laser power Pw in this order of Pw-11→Pw-12→Pw-13.

In the case of pit recording shown in FIG. 9, the degree of raising (protruding) the substrate 101 similarly increases in association with the increase of the laser power Pw in this order of Pw-p1→Pw-p2→Pw-p3. In this case, in a protrusion at the laser power level Pw-p2, the level of the pit bottom is close to that of the land and the heights of pit walls are relatively low. Accordingly, the amount of reflected light tends to increase as the level of the pit bottom is closer to that of the land.

As the laser power increases from the level Pw-p2, the degree of protrusion also increases, so that the level of the pit bottom is higher than that of the land. In this case, the height of each pit wall also increases in association with the increase of the laser power Pw. Consequently, the amount of reflected light tends to decrease because the pit is formed in a protruding portion.

As described above, in the case of pit recording, the reproduced signal level tends to increase in association with the increase of the laser power from the level Pw-P1 to that Pw-p2. On the contrary, the reproduced signal level tends to decrease in association with the increase of the laser power from the level Pw-p2 to that Pw-p3.

As described above, the recording apparatus 50 according to the present embodiment can deform a pit into a land, or deform a land into a pit on the primary-data recording disc D16 by changing the set recording power of the laser diode LD and can further reduce the reproduced signal level of a pit portion.

In order to realize pit-to-land deformation, the laser power for recording may be set to the level Pw-p2. On the other hand, in order to realize land-to-pit deformation, the laser power may be set to the level Pw-13.

In other words, for recording in a pit, the recording apparatus 50 shown in FIG. 4 sets the recording power of the laser diode LD to the level Pw-p2. On the other hand, for recording in a land, the recording apparatus 50 sets the recording power to the level Pw-13. Consequently, a pit formed in the primary-data recording disc D16 can be deformed into a land and a land formed therein can be deformed into a pit.

In order to concurrently rewrite data in a pit and rewrite data in a land, it is necessary to often change the recording power. When a first recording operation is performed on only pits and a second recording operation is then performed on only lands, i.e., the two recording operations are performed separately, recording power may be easily controlled such that the recording power is changed just before each recording operation. Specifically, for example, the write-pulse generation circuit 61 specifies positions of lands where data is to be rewritten on the basis of input rewrite designation data and outputs write pulse signals Wrp, each of which is at the H level in the corresponding specified position, to the laser control unit 64. Then, the rewriting operation is first performed on only the lands. Subsequently, the rewriting operation is performed on only pits on the basis of write pulse signals Wrp, each of which is at the H level in the position of the corresponding pit where data is to be rewritten. The laser power is controlled before the execution of each of the recording operation on only the lands and that on only the pits so that the recording power of the laser diode LD for the lands is set to the level Pw-13 and that for the pits is set to the level Pw-p2.

The above-described operations can realize rewriting recorded data using both of pit-to-land deformation and land-to-pit deformation.

As described above, according to the present embodiment, a pit formed in the primary-data recording disc D16 can be deformed into a land and a land formed therein can be deformed into a pit. Consequently, data (primary data) recorded on the disc D16 can be rewritten. Since both of pit-to-land deformation and land-to-pit deformation can be realized as described above, the flexibility of rewriting recorded data can be higher than that using either deformation.

In the present embodiment, the case where signals obtained by performing variable-length modulation on user data (content data) are written using the combination of pits and lands has been exemplified. For example, assuming that content data is recorded without being modulated, the descriptions of the content data can be rewritten because recorded data can be rewritten as described above.

Alternatively, if data obtained by performing variable-length modulation on content data is recorded using the combination of pits and lands in the same way as the present embodiment, the descriptions of the content data can be similarly rewritten so long as rewritten data is based on the modulation rule.

In this instance, recorded data is rewritten using both of pit-to-land deformation and land-to-pit deformation.

Recorded data can be rewritten using any of the deformation.

In the present embodiment, the experimental results shown in FIG. 5 are obtained under the following conditions:

Substrate 101 . . . polycarbonate;
Reflecting layer 102 . . . aluminum (Al) 70, iron (Fe) 15, copper (Cu) 15;
Adhesive between the cover layer 103 and the reflecting layer 102 . . . the UV curable resin 104;
Laser irradiation time (write pulse width)=30 ns;
Linear velocity=4.917 m/s;
Laser wavelength λ=405 nm; and
Numerical aperture NA=0.85.

The deformed states of the substrate 101 for realization of pit-to-land deformation and land-to-pit deformation can be controlled by setting the power of laser light applied through the recording apparatus 50.

In other words, in the present embodiment, under the above-described conditions (the above-described materials of the substrate 101, the reflecting layer 102, the cover layer 103, and the adhesive, the linear velocity, and the wavelength λ) where the variation characteristics of the reproduced signal levels as shown in FIG. 5 are obtained, the recording operation on pits is performed with the laser power Pw (Pw-p2) at which the reproduced signal level has a positive value and the recording operation on lands is performed with the laser power Pw (at or above the level Pw-12) at which the reproduced signal level has a negative value, so that pits can be deformed into lands and lands can be deformed into pits.

In addition, as for pit recording, recording is performed with the set laser power Pw (laser power Wp-p3) at which the reproduced signal level is further lowered, thus forming pits where the reproduced signal level is further lowered.

<4. Application Example>

An example of application of the recording method in accordance with the above-described embodiment will now be described.

In the application example, ID information blocks are assigned to respective primary-data recording discs D16 using the recording method according to the present embodiment, the ID information blocks being based on different values unique to the discs.

Figure 10:
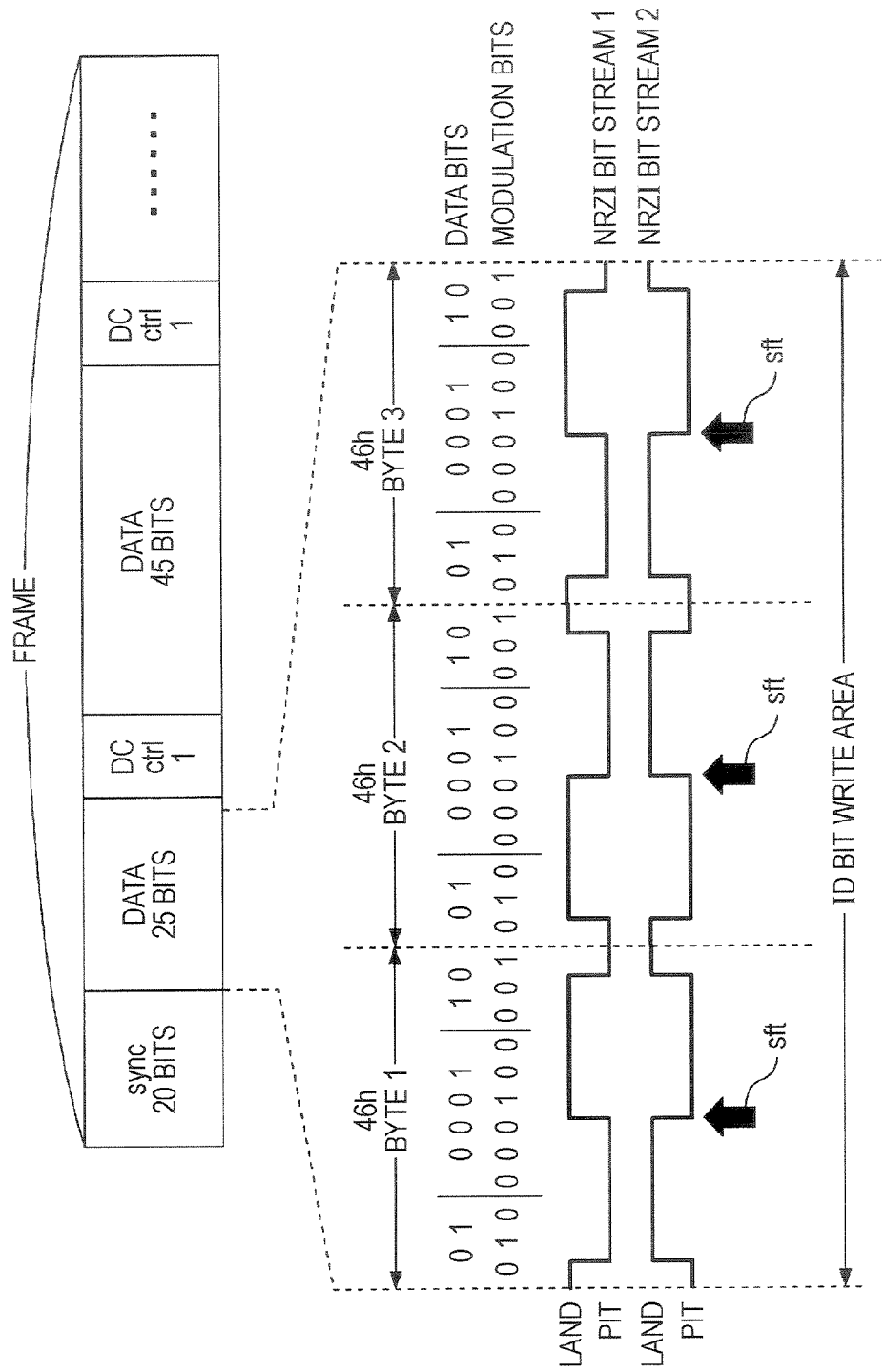
FIG. 10 is a data structure diagram explaining the data structure of recording data to be recorded onto an optical disc recording medium in an application example of the present embodiment.

FIG. 10 shows the data structure of data recorded on the primary-data recording disc D16 used in the application example, and particularly shows the structure of a frame shown in FIG. 3.

The structure of the frame shown in FIG. 10 represents data that is to be subjected to RLL (1, 7) PP modulation. In other words, RLL (1, 7) PP modulation is performed on the data (excluding sync) shown in FIG. 10, thus producing the frame of 1932 channel bits shown in FIG. 3.

The "sync" data includes 20 bits before modulation. In this case, a data area of 25 bits follows the sync. In addition, a pattern including DC control bits and data areas follows the 25-bit data area, each DC control bit including a single bit, each data area including 45 bits, the DC control bits and the 45-bit data areas being arranged in the pattern in this order of the DC control bit→the data area →the DC control bit, . . . .

In the present embodiment, an area including three bytes (24 bits), serving as the head portion of the 25-bit data area following the sync, is used as an ID bit write area for writing values of bits constituting ID information.

For values in the respective bytes (byte 1, byte 2, and byte 3 arranged in that order from the beginning of the area) in this ID bit write area, 46h is assigned to each byte as shown in the diagram. Accordingly, when data in each byte is subjected to RLL (1, 7) PP modulation and NRZI modulation and the resultant data is actually recorded as pits and lands, segments in each of which a land of 5 T is adjacent to a pit of 5 T are provided as shown in the diagram.

Specifically, 46h (01000110) is subjected to RLL (1, 7) PP modulation into "010000100001" that is indicated as "modulation bits" in the diagram. In recording waveforms after NRZI modulation, a set of 5-T pits and 5-T lands arranged in the order of 5-T pit→5-T land and a set of 5-T lands and 5-T pits arranged in the order of 5-T land→5-T pit are obtained as indicated by an NRZI bit stream 1 and an NRZI bit stream 2 shown in the diagram, thus providing segments in each of which a 5-T land is adjacent to a 5-T pit.

The reason why it is necessary to arrange the NRZI bit stream 1 and the NRZI bit stream 2 having different polarities for the same modulation bits is that the polarity of NRZI at the beginning of byte may be different from that of the last bit in the preceding frame in some cases.

In the application example in accordance with the present embodiment, after segments in each of which a land having a predetermined length is adjacent to a pit having the predetermined length are obtained in the respective bytes 1 to 3 in the ID bit write area, whether each boundary portion (edge) between the adjacent land and pit is shifted or not is determined, thus recording a value constituting ID information.

In other words, when an edge shift target portion sft, in which the edge is to be shifted, in the diagram is shifted, "1" is recorded as a value of ID information. If an edge shift target portion sft is not shifted, "0" is recorded as a value of ID information.

For confirmation, in this application example, formatting in the formatting step S11 shown in FIG. 2 is performed in order to obtain the frame structure shown in FIG. 10.

Figure 11:
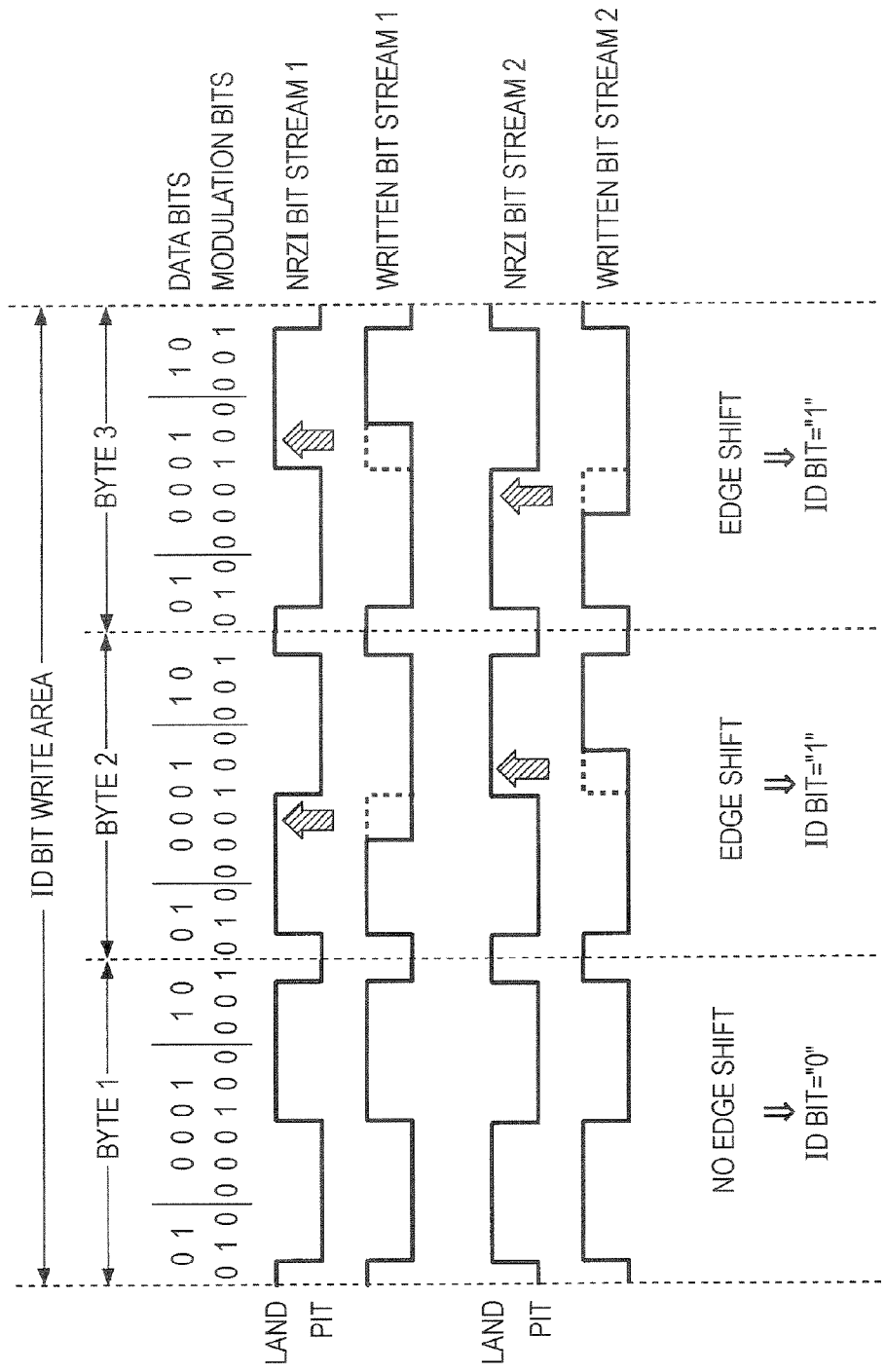
FIG. 11 is a diagram explaining a recording operation in the application example of the present embodiment.

FIG. 11 illustrates an example of the recording operation as an application example of the present embodiment.

In this example shown in FIG. 11, a land edge portion, serving as an edge shift target portion sft, is deformed into a pit, thereby performing edge shift. It is assumed that the edge is shifted by an amount of 1 T.

This diagram illustrates, as in FIG. 10, the relationship among data values (data bits) stored in the ID bit write area, modulation bits based on the data values, and recording waveforms of the NRZI bit stream 1 and the NRZI bit stream 2 of opposite polarities which may be obtained based on the modulation bits.

In this case, as described above, edge shift is performed by deforming a land edge portion into a pit. In each of the NRZI bit stream 1 and the NRZI bit stream 2, edge shift is performed by irradiating a land edge portion with laser light having a recording power, thus performing recording.

It should be noted that timing of laser light irradiation in the case of the polarity of the NRZI bit stream 1 is different from that in the case of the polarity of the NRZI bit stream 2. In other words, in the case of the polarity of the NRZI bit stream 1, an appropriate laser irradiation position in the byte 1 is the seventh clock from the beginning thereof, that in the byte 2 is the sixth clock from the beginning thereof, and that in the byte 3 is the seventh clock from the beginning thereof. On the other hand, in the case of the polarity of the NRZI bit stream 2, an appropriate laser irradiation position in the byte 1 is the sixth clock from the beginning thereof, that in the byte 2 is the seventh clock from the beginning thereof, and that in the byte 3 is the sixth clock from the beginning thereof.

In terms of the above-described fact, in order to appropriately perform edge shift, it is necessary to grasp information regarding the polarity of NRZI in a recording target frame.

For example, it is assumed that ID information values are to be recorded in the respective bytes such that "0" is to be written in the byte 1 and "1" is to be written in each of the byte 2 and the byte 3.

In this case, whether edge shift is performed in each byte is determined on the basis of the ID information value assigned to the byte. In other words, it is found that edge shift may be performed in each of the byte 2 and the byte 3 on the basis of the values "0", "1", and "1" assigned to the bytes 1 to 3.

In this instance, since the appropriate edge shift positions change depending on the polarity of the NRZI bit stream in the recording target frame, laser light irradiation is performed in the positions according to the polarity in the frame. In other words, for the polarity of the NRZI bit stream 1, as shown in the diagram, laser irradiation is performed in each of a position corresponding to the sixth channel bit from the beginning of the byte 2 and a position corresponding to the seventh channel bit from the beginning of the byte 3. Consequently, a land edge portion, serving as an edge shift target portion sft, can be appropriately shifted in each of the byte 2 and the byte 3.

For the polarity of the NRZI bit stream 2, laser irradiation is performed in each of a position corresponding to the seventh channel bit from the beginning of the byte 2 and a position corresponding to the sixth channel bit from the beginning of the byte 3. Thus, a land edge portion, serving as an edge shift target portion sft, can be appropriately shifted in each of the byte 2 and the byte 3.

With the above-described operation, "1" is written in each of the byte 2 and the byte 3 in this case. In other words, the above-described values "0", "1", and "1" are recorded in this ID bit write area.

Although FIG. 11 illustrates only the ID bit write area extracted from one frame, ID write areas are similarly arranged in other frames. Therefore, all values constituting ID information can be recorded by performing the above-described recording operation in a plurality of frames.

Recorded values can be evaluated, i.e., ID information can be reproduced as follows.

First, a reproducing apparatus reproduces data (primary data) recorded in the ID bit write area in each frame.

In the application example of the present embodiment, as shown in FIG. 10, the position of each ID bit write area and data values which should be stored in the area are defined by the format. Accordingly, the reproducing apparatus can recognize the position of each ID bit write area on the disc 100. Similarly, the data values stored in the respective bytes in each ID bit write area can be previously grasped.

The reproducing apparatus reproduces data in each ID bit write area and compares data reproduced from each byte with the data value (in this case, 46*h*) which should be stored in the byte.

When the data reproduced from the byte agrees with 46*h*, it can be determined that edge shift is not performed, that is, "0" is recorded. On the other hand, if the data does not agree with 46*h*, it can be determined that edge shift is performed, that is, "1" is recorded.

In this manner, ID information can be reproduced.

Since three values of ID information can be recorded in each frame as described above, the ID information can be recorded using bits obtained by multiplying the total number of frames by three. However, all of the frames are not necessarily used for recording ID information. For example, when the number of bits to be recorded as ID information is equal to or lower than a value obtained by multiplying the total number of frames by three, the ID information can be recorded using frames sufficient for recording all of bits constituting the ID information. In other words, the ID information may be recorded on some of all the frames.

Figure 12:
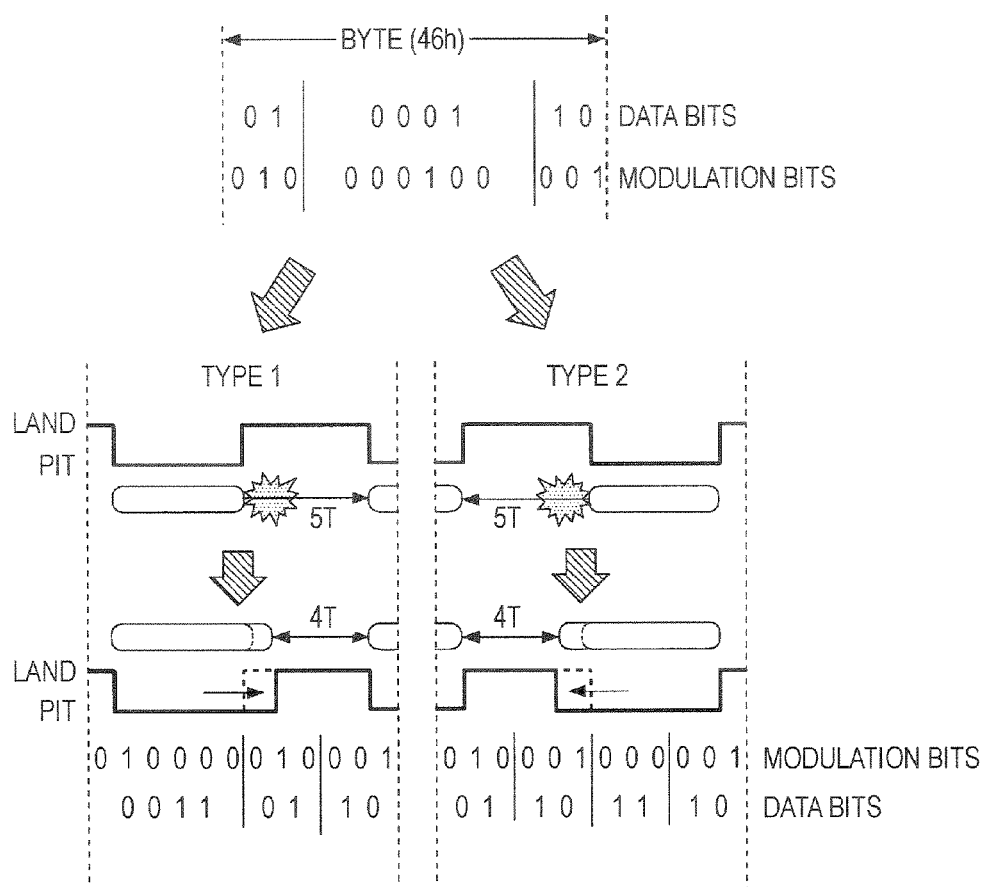
FIG. 12 is a diagram explaining the recording operation in the application example of the present embodiment.

For the sake of reference, FIG. 12 illustrates states of the surface of the disc 100 in which edge shift is performed, recording waveforms after the edge shift, and values of modulation bits and data bits obtained by the edge shift.

Referring to this diagram, the recording waveform, as indicated by a type 1, corresponds to that in each of the bytes 1 and 3 in the case of the polarity of the NRZI bit stream 1 and also corresponds to that in the byte 2 in the case of the polarity of the NRZI bit stream 2.

The recording waveform, as indicated by a type 2, corresponds to that in the byte 2 in the case of the polarity of the NRZI bit stream 1 and also corresponds to that in each of the bytes 1 and 3 in the case of the polarity of the NRZI bit stream 2. In other words, it is found that only the two types are provided as recording waveforms in each byte.

When the recording waveform is of the above-described type 1, the values of the modulation bits after the edge shift are "010000010001" as shown in the diagram. When the recording waveform is of the above-described type 2, the values thereof are "010001000001".

It is found that those values follow the RLL (1, 7) pp modulation rule.

In the present embodiment, values to be stored in the respective Bytes in the ID bit write areas are set so as to meet the conditions in which values obtained after edge shift follow the modulation rule.

This prevents a situation in which the reproducing apparatus does not appropriately reproduce data because the data does not follow the modulation rule.

For values obtained by reproducing (RLL (1, 7) pp demodulating) the modulation bits obtained after the edge shift in this case, values "00110110" are obtained in the type 1 and values "01101110" are obtained in the type 2 as indicated by data bits in the diagram.

In the above-described description, in the present embodiment, 46h is set as a data value to be stored in each byte in each ID bit write area. Accordingly, an edge shift target portion sft in each byte is set to an edge portion between the adjacent 5-T land and 5-T pit, and values following the modulation rule are obtained as modulation bits after edge shift.

In the present embodiment, the reason why such an edge shift target portion sft corresponds to an edge portion between the adjacent 5-T land and 5-T pit which are relatively long is as follows. Even if a range of deformation by laser irradiation is increased, the long length of each of the land and the pit related to the edge shift target portion lowers the possibility for shifting an edge that is not a target, thus decreasing the incidence of recording error of ID information.

In this case, as the land and the pit related to the edge shift target portion sft are longer, the occurrence of recording error can be more effectively prevented. In other words, the land length and the pit length are not limited to 5 T. When the length of each of lands and pits is set longer, the occurrence of recording error can be prevented with higher reliability.

In the present embodiment, 46h serving as data stored in each byte is described as an example of a value that satisfies the following two conditions in terms of preventing a recording error: a first condition that an edge shift target portion sft corresponds to an edge between a land and a pit each having a predetermined length or longer; and a second condition that modulation bits after edge shift follow the modulation rule. Data stored in each byte can be set to any value so long as the above-described conditions are satisfied.

When it is unnecessary to provide a measure of preventing recording errors using the length of each of a pit and a land related to each edge shift target portion sft, each of the pit and the land may have any length. In this case, it is necessary to set data bits stored in each byte to values that satisfy the conditions that an edge shift target portion sft is provided and the modulation bits after edge shift follow the modulation rule.

In the present embodiment, each bit write region (each byt) for recording one bit of ID information is a region of one byte=eight bits. Each region may include nine or more bits.

In this case, it is necessary to set values of data stored in each bit write region so that the data values meet the conditions that a pit is adjacent to a land and values of modulation bits after shift follow the modulation rule. Further, when the values are set so as to satisfy the condition obtained by arrangement of the adjacent pit and land each having a pre-determined length, the occurrence of recording error can be prevented with higher reliability.

Three bit write regions (in this case, the bytes 1 to 3) for recording one bit of ID information are provided in an ID bit write area arranged in each frame. The number of bit write regions is not particularly limited.

The structure of a recording apparatus for realizing a recording operation as the present application example in the above description will now be described with reference to FIG. 4.

The fundamental structure of the recording apparatus in the present application example is the same as that of the recording apparatus 50 shown in FIG. 4. Components to be added to the recording apparatus 50 for realizing the operation in the present application example will be described. Assuming that the other components are similar to those described above with reference to FIG. 4, an explanation of the previously described components is omitted.

To realize the operation of recording ID information described above, it is necessary to input values of the ID information to be recorded and information about the polarity of NRZI (hereinafter, NRZI polarity information) in each frame to the recording apparatus 50.

In other words, whether edge shift should be performed can be determined in each byte of each frame on the basis of the input values of the ID information.

For the NRZI polarity information, as described above, a bit shift target position depends on the polarity of NRZI, that is, the target position is the seventh or sixth clock from the beginning of the corresponding byte. The NRZI polarity information is therefore needed to perform bit shift in an appropriate position according to the corresponding polarity.

In this instance, in the recording apparatus 50, the values constituting the ID information and NRZI polarity information blocks related to respective frames are supplied as rewrite designation data, shown in FIG. 4, to the write-pulse generation circuit 61.

For confirmation, the recording apparatus 50 in this case is managed on the side of a manufacturer of the primary-data recording disc D16 (disc 100). Therefore, values of recording data to be recorded onto the disc D16, serving as a ROM disc, can be previously grasped. Since values of recording data to be recorded onto the disc D16 can be grasped, the above-described NRZI polarity information blocks related to respective frames can be obtained on the manufacturer side.

In the write-pulse generation circuit 61, the values of the ID information (hereinafter, ID information values) and the polarity information blocks are supplied as the above-described rewrite designation data to the write-pulse generator 63. The write-pulse generator 63 stores those ID information values and the polarity information blocks into the RAM 62 such that each value and each polarity information block are assigned to the corresponding frame (address).

FIG. 13 shows the descriptions of data stored in the RAM 62 at that time.

As illustrated in the diagram, the input ID information values are stored such that a value is allocated to each byte in each address (frame). Further, information indicative of the polarity of NRZI is stored in each address in such that the polarity is associated with the address.

In this case, the recording apparatus 50 performs the following operation on the basis of the data, shown in FIG. 13, stored in the RAM 62.

First, the write-pulse generator 63 specifies at least one byte, in which edge shift should be performed, in each of recording target frames on the basis of the above-described data stored in the RAM 62.

The polarity of NRZI in each target frame is determined on the basis of information "1" or "0" stored in association with the frame. In this case, "1" indicates the polarity of the previously described NRZI bit stream 1 and "0" indicates the polarity of the NRZI bit stream 2.

After that, an edge shift position is recognized in each ID bit write area on the basis of information regarding the specified byte and the polarity information.

In this instance, when the polarity is indicated by "1", it is found that an edge shift position in each of the bytes 1 and 3 is the seventh channel bit from the beginning thereof and an edge shift position in the byte 2 is the sixth channel bit from the beginning thereof. If the polarity is indicated by "2", it is found that an edge shift position in each of the bytes 1 and 3 is the sixth channel bit from the beginning thereof and an edge shift position in the byte 2 is the seventh channel bit from the beginning thereof.

Appropriate edge shift positions can be recognized on the basis of the above-described information and the information regarding the specified byte(s).

After the appropriate edge shift positions based on the values assigned to each frame and the polarity information are recognized, the write-pulse generator 63 generates a data string of one frame, in which a data value corresponding to each recognized edge shift position is "1" and other data values are "0", for each frame.

In other words, assuming that "1" is recorded as ID information in each byte of a certain frame and the polarity in the frame is indicated by "1", under the condition that one frame includes 1932 channel bits, a data string of one frame is generated such that the seventh channel bit from the beginning of the byte 1, the sixth channel bit from the beginning of the byte 2, and the sixth channel bit from the beginning of the byte 3 are "1" and other 1929 channel bits are "0".

The write-pulse generator 63 generates such a data string for each of target frames to which the ID information is recorded.

In actual recording, while the reproducing operation is performed on the primary-data recording disc D16, write pulse signals Wrp based on the data strings are supplied to the laser control unit 64, the level of each signal falling to the L level when a data value is "0" and rising to the H level when a data value is "1".

As described above, the laser control unit 64 controls the laser output of the laser diode LD so that when the write pulse signal Wrp is at the L level, laser light having a reproducing power is output, and when the write pulse signal Wrp is at the H level, laser light having a recording power is output. In other words, therefore, in the primary-data recording disc D16, only each portion where edge shift should be performed can be irradiated with laser light having a recording power. Consequently, the input ID information values can be appropriately recorded onto the disc D16. In this case, each ID information value is recorded using edge shift caused by land-to-pit deformation. Accordingly, the laser diode LD in this case is set so that the recording power is set to the laser power level Pw-13 at which a land can be deformed into a pit.

Figure 14:
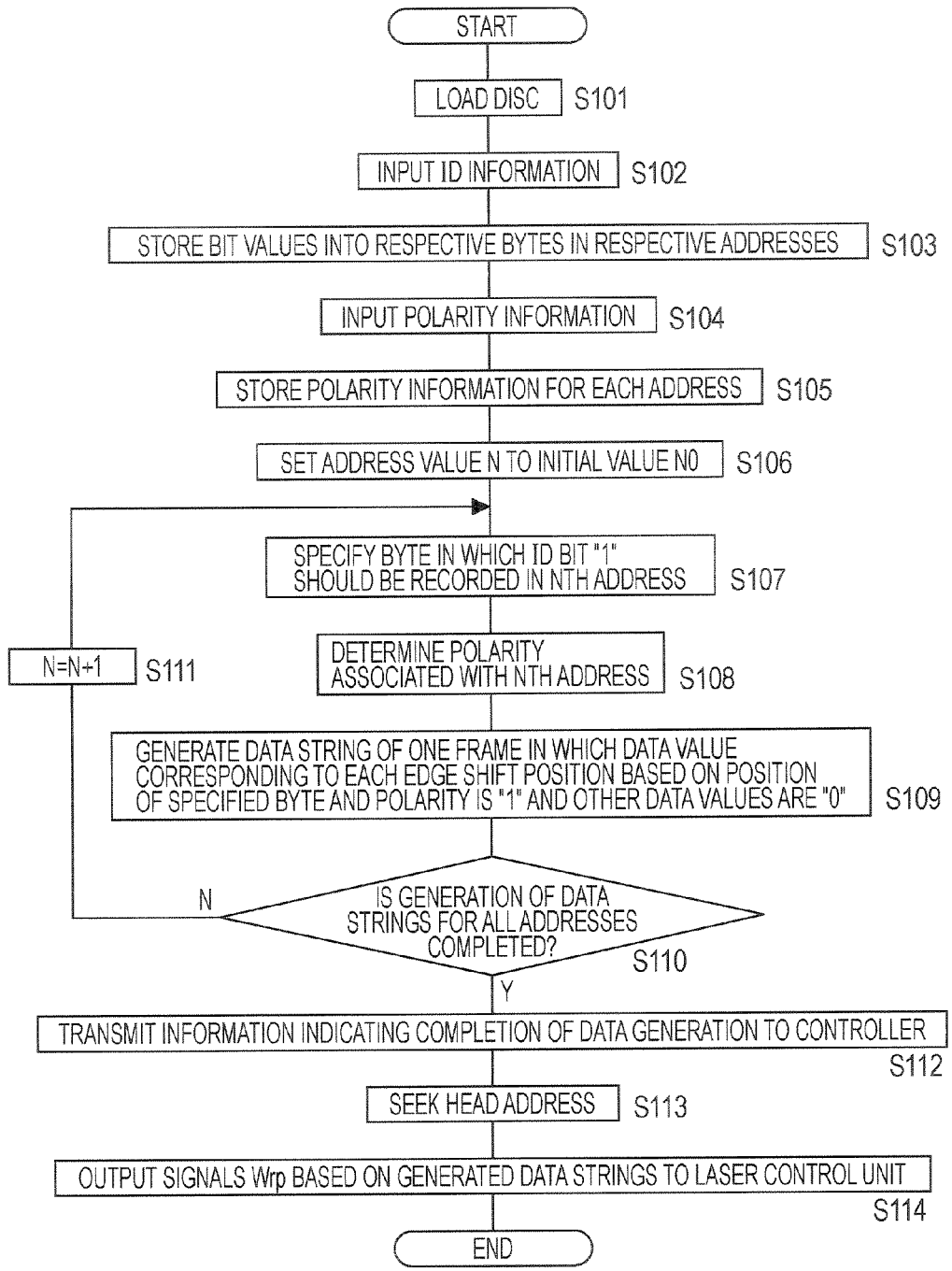
FIG. 14 is a flowchart of an operation to be performed in the recording apparatus for realizing the operation in the application example of the present embodiment.

The operation of recording ID information by the recording apparatus 50 in this case will now be described in more details with reference to a flowchart of FIG. 14. Referring to FIG. 14, in step S101, the primary-data recording disc D16 is first loaded.

In step S102, ID information to be recorded is input. As described above, values of the ID information input to the recording apparatus 50 are supplied as rewrite designation data to the write-pulse generator 63.

In step S103, the write-pulse generator 63 stores the input ID information values into respective bytes in respective addresses.

For example, the ID information values in this case are sequentially assigned to respective bytes from the head frame. In step S103, the input values are sequentially stored into storage regions of the respective bytes in the respective frames in the RAM 62 shown in FIG. 13.

In step S104, polarity information is input. The polarity information is also supplied as rewrite designation data to the write-pulse generator 63.

In step S105, the write-pulse generator 63 stores a polarity information block in each address.

Since each polarity information block indicates the polarity of NRZI associated with the corresponding address, the write-pulse generator 63 stores a value "0 or 1" indicating the polarity into each storage region in the RAM 62 shown in FIG. 13 such that the relationship between the polarity of NRZI and each address is held.

The input and storage of the polarity information may be performed in advance of the input and storage of the ID information.

In this case, the ID information values and the polarity information blocks serving as the rewrite designation data are separately input. The ID information values and the polarity information blocks may be simultaneously input and be stored by different storage processes.

In this case, the ID information and the polarity information are input after loading of the disc D16. Those information sets may be input before or after loading.

In step S106, an address value N is set to an initial value NO.

In this step S106, the write-pulse generator 63 sets a value of a counter built therein to the initial value NO to generate a data string for each address as will be described below.

In step S107, an operation of specifying a byte, in which "1" should be recorded as an ID information value (ID bit), in an Nth address is performed. In other words, the write-pulse generator 63 refers to the ID information values stored in the respective bytes in the Nth address in the RAM 62 and specifies at least one byte including an ID bit "1".

In step S108, the polarity associated with the Nth address is determined. In other words, the write-pulse generator 63 determines whether a value indicating the polarity stored in association with the Nth address in the RAM 62 is "0" or "1".

In step S109, a data string of one frame in which a data value corresponding to each edge shift position is "1" and other data values are "0" is generated in accordance with the position of the specified byte and the polarity.

As described above, when the polarity is indicated by "1", a land edge portion, serving as an edge shift target portion sft, corresponds to the seventh channel bit from the beginning of each of the byte 1 and the byte 3 and also corresponds to the sixth channel bit from the beginning of the byte 2. On the other hand, when the polarity is indicated by "0", a land edge portion corresponds to the seventh channel bit from the beginning of the byte 2 and also corresponds to the sixth channel bit from the beginning of each of the byte 1 and the byte 3.

Accordingly, the write-pulse generator 63 can specify an edge shift position on the basis of information regarding the byte specified in the above-described step S107 and information about the polarity determined in step S109.

The above-described edge shift positions can be specified using a table containing information regarding edge shift positions based on the combination of information about recording target bytes and polarity information.

Then, the write-pulse generator 63 generates a data string of one frame in which a data value corresponding to each specified edge shift position is "1" and other data values are "0".

Since a data string for each frame generated in step S109 is used for generation of write pulse signals Wrp at a later stage, the data string is held in association with the corresponding address in the RAM 62.

After generation of the one-frame data strings, the write-pulse generator 63 determines whether generation of data strings for all of the addresses is completed (S110). In other words, it is determined whether generation of all of the data strings for all of the previously set frames to which the ID information is to be recorded is completed.

The operation in step S110 is performed on the basis of determination by the write-pulse generator 63 whether the counter value, set to the initial value NO in step S106, reaches a predetermined value.

If a negative determination is obtained because the counter value does not reach the predetermined value, the address value N is incremented by one (step S111). After that, the process is returned to the above-described step S107, thus generating the data strings for all of the frames to which the ID information is to be recorded.

If it is determined in step S110 that generation of the data strings for all of the addresses is completed because the counter value reaches the predetermined value, information indicating the completion of data generation is sent to the controller 65, shown in FIG. 4, in step S112. In other words, the write-pulse generator 63 recognizes that generation of the data strings for all of the addresses as described above is completed and then transmits information indicating the fact, i.e., the completion of data generation to the controller 65.

In accordance with the information, the controller 65 performs a control operation for seeking the head frame (address), in which the ID information is to be recorded, on the loaded primary-data recording disc D16 (step S113). The controller 65 designates a target address to the servo circuit 55 on the basis of previously stored information regarding the address of the head frame on the disc D16, so that this seek operation can be performed.

In accordance with the operation of seeking the head address as described above, the write-pulse generator 63 outputs write pulse signals Wrp based on the data strings generated for the respective frames in the above-described step S109 to the laser control unit 64 (step S114). The write pulse signals Wrp based on the data strings are output on the basis of timing provided by the clocks CLK so as to be synchronized with reproduced data. The output of the write pulse signals Wrp may be started at timing based on the input of information indicating the head address, the input information being address information ADR supplied from the address detection circuit 60.

As the write pulse signals Wrp output in step S114, the obtained signals each go to the H level in each of appropriate edge shift positions based on the input ID information values and the polarity information. In other words, the laser control unit 64 controls the laser output of the laser diode LD from a reproducing power level to a recording power level on the basis of the write pulse signals Wrp, thus appropriately recording the input ID information values onto the disc D16.

In FIG. 14, the ID information values are externally input. A circuit for generating a new serial number each time the disc D16 is loaded may be provided and values of ID information output from this circuit may be sequentially stored into the RAM 62.

As for polarity information, if the discs D16 have the same title, i.e., the same descriptions of recorded data, those discs D16 have the same relationship between frames and polarities associated with the frames. Accordingly, in manufacturing the discs D16 having the same title, the steps (S104 and S105) of inputting and storing polarity information each time a disc is loaded shown in FIG. 14 can be omitted.

While the embodiment of the present invention has been described, it should be understood that the present invention is not limited to the described embodiments.

For example, in the application example of the embodiment, for the convenience of explanation, ID information values are sequentially recorded onto bytes in order from the byte 1 in the head frame. Actually, in order to make it difficult for a third party to specify ID information, ID information values may be written in random order using, for example, M-series random numbers.

In this case, a reproducing apparatus 1 determines reproducing order using the same random number generation, so that ID information values can be appropriately reproduced. Alternatively, when reproducing order is not changed and the order of values obtained by reproducing is changed on the basis of random numbers, ID information can be appropriately reproduced.

In the application example of the present embodiment, an edge shift target portion sft is shifted by 1 T. The amount of shift may be longer than 1 T.

Figure 15:
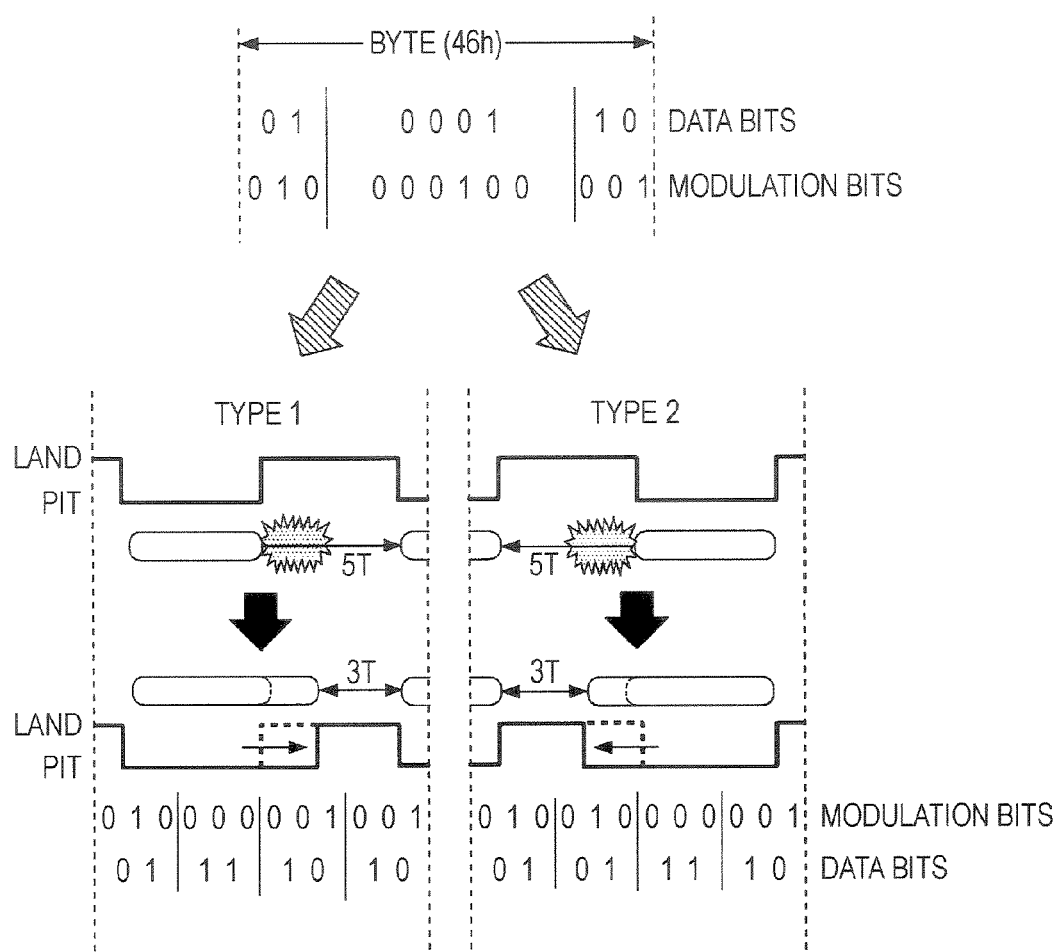
FIG. 15 is a diagram explaining an operation in a case where edge shift is performed by 2 T.

FIG. 15 shows a case where, for example, an edge shift target portion sft is shifted by 2 T. FIG. 15 also illustrates states of the surface of a disc in which edge shift is performed, recording waveforms after the edge shift, and values of modulation bits and data bits obtained by the edge shift in a manner similar to FIG. 12.

As will be understood with reference to this diagram, in the case where edge shift is performed by 2 T, if a recording waveform is of the type 1 (i.e., the recording waveform in each of the byte 1 and the byte 3 in the case of the polarity of the NRZI bit stream 1 or that in the byte 2 in the case of the polarity of the NRZI bit stream 2), a portion corresponding to the seventh and eighth channel bits from the beginning of the byte is to be irradiated with laser light. On the other hand, if a recording waveform is on the type 2 (i.e., the recording waveform in the byte 2 in the case of the polarity of the NRZI bit stream 1 or that in each of the byte 1 and the byte 3 in the case of the polarity of the NRZI bit stream 2), a portion corresponding to the fifth and sixth channel bits from the beginning of the byte is to be irradiated with laser light.

In this case, when the recording waveform is of the above-described type 1, the values of the modulation bits after the edge shift are "010000001001" as shown in the diagram. When the recording waveform is of the above-described type 2, the values thereof are "010010000001". In this instance, it is also found that those values follow the RLL (1, 7) pp modulation rule. In other words, if edge shift is performed by 2 T, a value "46*h*" to be stored in each byte in the present embodiment meets the condition that values obtained after the edge shift follow the modulation rule.

In fact, values of data bits obtained after the edge shift in the case of the type 1 are "01111010" and values in the case of the type 2 are "01011110".

In the recording waveform based on the above-described 46*h* stored in each byte in this case, when edge shift is performed by 3 T or longer, modulation bits obtained after the shift include part that does not follow the modulation rule (in other words, a pit of 8 T is formed in this case). Therefore, the amount of edge shift may depend on the length of each of a pit and a land related to an edge shift target portion sft and may be set in such a range that values of modulation bits after the shift follow the modulation rule.

Although edge shift is performed by deforming a land into a pit in the application example, recording can be similarly performed using edge shift caused by pit-to-land deformation. When a pit is deformed into a land, however, a pit edge portion, serving as an edge shift target portion sft, is a target to be shifted. Accordingly, contrary to the case where a land edge portion is a target to be shifted as described above, in the case of the polarity of the NRZI bit stream 1, an edge shift position in each of the byte 1 and the byte 3 is the sixth clock from the beginning thereof and that in the byte 2 is the seventh clock from the beginning thereof. In the case of the polarity of the NRZI bit stream 2, an edge shift position in each of the byte 1 and the byte 3 is the seventh clock from the beginning thereof and that in the byte 2 is the sixth clock from the beginning thereof.

Since the laser power level Pw necessary for pit-to-land deformation is the level Pw-p2 according to the characteristics shown FIG. 5, it is necessary to set the recording power of the laser diode LD to that power level Pw in this case.

According to the characteristics shown in FIG. 5, a reproduced signal level in a pit can be further reduced in addition to a reduction for land-to-pit deformation or that for pit-to-land deformation as described above.

When a pit edge portion is irradiated with laser light to further reduce a reproduced signal level as shown in (a) of FIG. 16, a reproduced signal level in this edge portion is reduced as shown by a reproduced signal waveform shown in (b) of FIG. 16 and a reproduced signal level in the adjacent land is also reduced with the above-described reduction. In other words, the same advantages as that obtained by extending a pit can be obtained.

ID information can be recorded by edge shift caused by such pit extension. According to the characteristics shown in FIG. 5, the pit extension can be realized using laser power at the level Pw-p3. Accordingly, the laser diode LD may be set so as to obtain a recording power at the laser power level Pw-p3.

In the case where recording is performed using the above-described pit extension, edge shift is performed on a pit edge portion in a manner similar to the above-described pit-to-land deformation. Accordingly, in the case of the polarity of the NRZI bit stream 1, an edge shift position in each of the byte 1 and the byte 3 is the sixth clock from the beginning thereof and that in the byte 2 is the seventh clock from the beginning thereof. In the case of the polarity of the NRZI bit stream 2, an edge shift position in each of the byte 1 and the byte 3 is the seventh clock from the beginning thereof and that in the byte 2 is the sixth clock from the beginning thereof.

In the present application example, information unique to each disc D16 is recorded on the disc D16. Control information for reading content data may be written into each disc D16 in place of the above-described ID information such that the contents of control vary from disc to disc. Consequently, different contents can be reproduced from different discs 100.

For content data of, for example, a movie, the contents of the movie may be made partially different from one another, alternatively, the endings of the movie may be made different from one another, thus improving entertainment. For example, the mass-produced primary-data recording discs D16 are stored in a factory, and control information that varies from area of shipment destination to area is written into each disc in advance of shipment of the discs. Consequently, the endings of a story can vary from selling area to selling area.

As described above, according to the present invention, a pit can be deformed into a land, alternatively, a land can be deformed into a pit, thereby rewriting data recorded on an optical disc recording medium.

In this instance, since both of pit-to-land deformation and land-to-pit deformation can be performed according to the present invention, the flexibility of rewriting recorded data can be higher than that using either deformation.

The invention claimed is:

1. A recording method for a recording apparatus that performs recording on an optical disc recording medium, the medium including a substrate overlaid with at least a reflecting layer and a cover layer and being previously recorded with data using a combination of pits and lands formed in the substrate, the method comprising:
   irradiating the previously recorded pits or the lands in the optical disc recording medium with laser light having a predetermined laser power to generate a set of protruding portions, the set of protruding portions having formed therein pits and lands, thereby rewriting the data.

2. The method according to claim 1, wherein
   the laser irradiation is controlled so that the previously recorded pits are targets to be irradiated with the laser light having the predetermined laser power, and
   the predetermined laser power is set so that the irradiated portion of the substrate is deformed into the protruding portion in which a reproduced signal level is equivalent to that in each previously recorded land.

3. The method according to claim 1, wherein
   the laser irradiation is controlled so that the previously recorded lands are targets to be irradiated with the laser light having the predetermined laser power, and
   the predetermined laser power is set so that the irradiated portion of the substrate is deformed into the protruding portion in which a reproduced signal level is equivalent to that in each previously recorded pit.

4. The method according to claim 1, wherein
   the irradiating further comprises irradiating the previously recorded pits or the previously recorded lands in the optical disc recording medium that includes bit write regions in a plurality of predetermined positions, each bit write region being recorded with a predetermined pattern of data such that at least a land and a pit are formed in adjacent to each other when the data is recorded, and
   the laser irradiation is controlled so that an edge portion of the previously recorded land or pit in each bit write region is a target to be irradiated with the laser light having the predetermined laser power.

5. The method according to claim 4, wherein data is recorded in each bit write region using a pattern including an adjacent land and pit each having a predetermined length or longer.

6. The method according to claim 4, wherein
   the laser irradiation is controlled so that an edge portion of the previously recorded land in each bit write region is a target to be irradiated with the laser light having the predetermined laser power, and
   the predetermined laser power is set so that the irradiated portion of the substrate is deformed into the protruding portion in which a reproduced signal level is equivalent to that in the previously recorded pit.

7. The method according to claim 4, wherein
   the laser irradiation is controlled so that an edge portion of the previously recorded pit in each bit write region is a target to be irradiated with the laser light having the predetermined laser power, and
   the predetermined laser power is set so that the irradiated portion of the substrate is deformed into the protruding portion in which a reproduced signal level is equivalent to that in the previously recorded land.

8. The method according to claim 4, wherein
the laser irradiation is controlled so that an edge portion of the previously recorded pit in each bit write region is a target to be irradiated with the laser light having the predetermined laser power, and
the predetermined laser power is set so that the irradiated portion of the substrate is deformed into the protruding portion in which a reproduced signal level is equivalent to that in another previously recorded pit.

9. An optical disc recording medium including a substrate overlaid with at least a reflecting layer and a cover layer, the medium being previously recorded with data using a combination of pits and lands formed in the substrate, wherein
the data is rewritten over the previously recorded pits or the lands in the substrate by irradiating the corresponding portions of the substrate with laser light to generate a set of protruding portions, the set of protruding portions having formed therein pits and lands.

* * * * *